United States Patent
Zhou et al.

(10) Patent No.: US 10,146,179 B2
(45) Date of Patent: Dec. 4, 2018

(54) EXPOSURE METHOD OF HOLOGRAPHIC GRATING AND EXPOSURE LIGHT PATH

(71) Applicant: Graduate School at Shenzhen, Tsinghua University, Shenzhen, Guangdong (CN)

(72) Inventors: Qian Zhou, Guangdong (CN); Kai Ni, Guangdong (CN); Rui Tian, Guangdong (CN); Jinchao Pang, Guangdong (CN); Mingfei Xu, Guangdong (CN); Hao Dong, Guangdong (CN); Jinchao Zhang, Guangdong (CN)

(73) Assignee: GRADUATE SCHOOL AT SHENZHEN, TSINGHUA UNIVERSITY, Shenzhen, Guangdong (CN)

( * ) Notice: Subject to any disclaimer, the term of this patent is extended or adjusted under 35 U.S.C. 154(b) by 209 days.

(21) Appl. No.: 15/205,147

(22) Filed: Jul. 8, 2016

(65) Prior Publication Data

US 2016/0320750 A1   Nov. 3, 2016

Related U.S. Application Data

(63) Continuation of application No. PCT/CN2014/073711, filed on Mar. 19, 2014.

(30) Foreign Application Priority Data

Jan. 26, 2014   (CN) .......................... 2014 1 0038074

(51) Int. Cl.
*G03H 1/04* (2006.01)
*G02B 5/18* (2006.01)
(Continued)

(52) U.S. Cl.
CPC ............... *G03H 1/041* (2013.01); *G02B 5/18* (2013.01); *G02B 5/32* (2013.01); *G02B 27/0012* (2013.01);
(Continued)

(58) Field of Classification Search
CPC ........ G03H 1/041; G03H 1/04; G03H 1/0402; G03H 2001/0439; G02B 5/18; G02B 5/32; G02B 27/0012; G02B 27/44
(Continued)

(56) References Cited

U.S. PATENT DOCUMENTS

| 3,973,850 A | * | 8/1976 | Pouey ................... G01J 3/1838 356/305 |
| 5,880,834 A | * | 3/1999 | Chrisp ..................... G01J 3/02 356/305 |

(Continued)

FOREIGN PATENT DOCUMENTS

| CN | 1845016 | 10/2006 |
| CN | 1845017 | 10/2006 |

(Continued)

OTHER PUBLICATIONS

Qian Zhou, Xinghui Li, Kai Ni, Rui Tian, and Jinchao Pang, "Holographic fabrication of large-constant concave gratings for wide-range flat-field spectrometers with the addition of a concave lens," Opt. Express vol. 24, Issue 2, pp. 732-738, Jan. 11, 2016.*
(Continued)

*Primary Examiner* — William R Alexander
(74) *Attorney, Agent, or Firm* — Hamre, Schumann, Mueller & Larson, P.C.

(57) ABSTRACT

The invention provides an exposure method of a holographic grating and an exposure light path. The exposure method includes: (1) determining initial positions (C, D) of the two exposure light sources (S1, S2); (2) calculating imaging
(Continued)

quality parameters of the grating; (3) setting a compensating mirror (A1) in the initial light path; (4) adjusting a position of the exposure light source (S1) to a new position (D1) according to a position of the compensating mirror (A1); (5) calculating imaging quality parameters of the grating; (6) judging whether the imaging quality parameters in the step (5) and the imaging quality parameters in the step (2) are equal, and if yes, using the new position (D1) as a final position of the exposure light source (S1). The exposure method and exposure light path may effectively solve a problem of a much too close distance between exposure light sources.

10 Claims, 4 Drawing Sheets

(51) Int. Cl.
  *G02B 5/32* (2006.01)
  *G02B 27/44* (2006.01)
  *G02B 27/00* (2006.01)

(52) U.S. Cl.
  CPC .............. *G02B 27/44* (2013.01); *G03H 1/04* (2013.01); *G03H 1/0402* (2013.01); *G03H 2001/0439* (2013.01)

(58) Field of Classification Search
  USPC ............................................. 359/3
  See application file for complete search history.

(56) References Cited

U.S. PATENT DOCUMENTS

| | | | | |
|---|---|---|---|---|
| 7,098,871 B1* | 8/2006 | Tegreene | ............ | G02B 26/101 345/7 |
| 9,865,447 B2* | 1/2018 | Chuang | ................. | H01J 61/025 |
| 2002/0180931 A1* | 12/2002 | Dick | ....................... | A61B 3/14 351/211 |
| 2006/0238710 A1* | 10/2006 | Dick | ..................... | A61B 3/103 351/211 |
| 2015/0002816 A1* | 1/2015 | Kowal | ................... | A61B 3/156 351/207 |
| 2016/0110873 A1* | 4/2016 | Engel | .................... | G09B 19/24 382/106 |
| 2017/0085867 A1* | 3/2017 | Baran | ................. | H04N 13/122 |

FOREIGN PATENT DOCUMENTS

| | | |
|---|---|---|
| CN | 101246229 | 8/2008 |
| CN | 101840193 | 9/2010 |
| CN | 102197345 | 9/2011 |
| EP | 0303836 | 2/1989 |
| GB | 2195784 | 4/1988 |
| JP | 2001-154183 | 8/2001 |
| WO | 9530179 | 11/1995 |

OTHER PUBLICATIONS

International Search Report issued in the corresponding International PCT Application No. PCT/CN2014/073711, dated Oct. 27, 2014, 6 pages.

Xiaorui, Qiao et al., Real-time interactive projection system based on infrared structured-light method, Optoelectronic Imaging and Multimedia Technology II, edited by Tsutomu Shimura et al. Nov. 30, 2012, vol. 8558, 855802-1. [Online] [Retrieved on Mar. 14, 2016] retrieved at <http://proceedings.spiedigitallibrary.org/>, 8 pages. Office Action for corresponding Chinese Application, CN 201410038074.4, dated Jun. 24, 2015, 5 pages.

* cited by examiner

EXPOSURE METHOD OF HOLOGRAPHIC GRATING AND EXPOSURE LIGHT PATH

CROSS REFERENCE TO RELATED APPLICATIONS

This application is a continuation application of PCT/CN2014/073711, filed on Mar. 19, 2014. The contents of PCT/CN2014/073711 are all hereby incorporated by reference.

TECHNICAL FIELD

The present application relates to a holographic grating, in particular to an exposure method of the holographic grating and an exposure light path.

RELATED ARTS

A holographic grating comprises exposure treatment in a manufacturing process. As shown in FIG. 1, exposure light sources S1 and S2 emit two coherent light beams, and interference exposure is performed on a grating substrate L. In an exposure process, a spatial position of the light sources S1 and S2 relative to a center position O of the grating substrate L will influence parameter indexes of the manufactured holographic grating. Usually, according to manufacturing design requirements (such as a working wavelength, appearance size and slit width of the grating and a spectrum surface length) and imaging quality requirements (such as resolution and flexibility) of the holographic grating, above parameters are substituted into an light path function, and by taking the imaging quality requirements of the holographic grating as a target, it is determined that positions of the two exposure light sources S1 and S2 in FIG. 1 are positions C and D in FIG. 1 by using an light path function theory. An exposure light path is established according to the determined light source positions, the grating substrate L is exposed and an obtained grating accords with design and imaging quality requirements.

In a practical grating light path, generally, a laser, an optical component and two spatial filters generate two exposure light beams as shown in FIG. 1, which serve as two paths of exposure light sources. Each spatial filer consists of a micro-objective and a pin hole. In above exposure method, with manufacturing requirements of certain gratings, a determined distance between the exposure light sources S1 and S2 is very close. When a practical exposure light path is established, a problem of blocking the light beams of the exposure light path after the spatial filters are mounted is caused. Particularly, under the manufacturing requirements of certain wide-spectrum gratings, due to a size limitation of a detector such as a CCD, an equivalent grating line density of the grating cannot be over dense, which requires a smaller included angle (the included angle between OS1 and OS2 in FIG. 1) of two exposure arms, then the problem of a much too close distance between two exposure points is more obvious. In such case, exposure manufacturing of the grating cannot even be performed.

In order to solve the problem of blocking due to the much too close distance, two methods are put forward: one method is to adopt a specially manufactured micro-objective. The specially manufactured micro-objective is smaller in size, the specially manufactured micro-objective and the pin hole form a spatial filter, so that the size of the spatial filter is also reduced and blocking is avoided. However, correspondingly, performances of the specially manufactured micro-objective are also reduced, then a final aberration capacity is influenced, and imaging quality of a manufactured grating is influenced. The other method is to separate and structure the micro-objective and the pin hole respectively. However, the spatial filter structured separately greatly improves adjustment difficulty.

SUMMARY

A technical problem to be solved by the embodiments of the present application is to overcome defects of prior art and provide an exposure method of a holographic grating and an exposure method, and a problem of a much too close distance between exposure light sources may be effectively solved under the premise of not influencing manufacturing requirements and imaging requirements of a grating.

The technical problem of the embodiments of the present application is to be solved by a following technical solution:

An exposure method of a holographic grating uses two exposure light sources to emit two coherent light beams and performs interference exposure on substrate of a grating and comprises a step of adjusting positions of the two exposure light sources to form an exposure light path: (1) determining initial positions of the two exposure light sources according to design requirements and imaging quality requirements of the holographic grating; (2) adopting optical design software to simulate an initial light path that the two exposure light sources are in the initial positions, and calculating imaging quality parameters of the grating formed after the simulated initial light path works; (3) setting a compensating mirror in the initial light path; (4) adjusting positions of the exposure light sources to new positions according to a position of the compensating mirror, wherein the new positions meet conditions that when the exposure light sources are in the new positions, imaging points transmitting through the compensating mirror are the initial positions; (5) adopting optical design software to simulate a new light path that the compensating mirror is arranged and the exposure light sources are in the new positions, and calculating imaging quality parameters of the grating formed after the simulated new light path works; (6) judging whether a differential value between the imaging quality parameters in the step (5) and the imaging quality parameters in the step (2) is smaller than or equal to a set threshold value, under the condition of yes, entering to a step (7), and under the condition of no, adjusting the position of the compensating mirror and returning to steps (4)-(5); and the (7) using the new positions as finial positions of the exposure light sources, and using the new light path that the compensating mirror is arranged and the exposure light sources are in the new positions as a finial exposure light path.

An exposure light path of a holographic grating comprises two exposure light sources, a compensating mirror and substrate of a grating; positions of the two exposure light sources are set according to above exposure method, to cause the two exposure light sources to form an exposure light path together with the compensating mirror and the grating substrate; and the two exposure light sources emit two coherent light beams and interference exposure is performed on the substrate of the grating.

Compared with the prior art, the embodiments of the present application may have the beneficial effects:

According to the exposure method of a holographic grating and the exposure light path, the compensating mirror is arranged, new positions are obtained by adjusting according to initial positions of the exposure light sources, the compensating mirror is additionally arranged in an initial exposure light path, and a new exposure light path is formed after the exposure light sources are moved to the new positions. In a process of setting the compensating mirror and adjusting the positions of the exposure light sources, according to a fact that whether grating imaging quality parameters obtained when the grating substrate is simulated and exposed under the new light path are close to the grating imaging quality parameters obtained in the initial light path, the final imaging quality is not influenced while the positions of the light sources are adjusted. The exposure method and exposure light path of the embodiments of the present application may enlarge a distance between the exposure light sources under a premise of not influencing the quality of a manufactured grating, thus effectively solving the problem that a light beam of an exposure branch is blocked due to a much too close distance between the exposure light sources, and solving the problem that certain wide-spectrum gratings cannot be exposed and manufactured due to requirements of a manufacturing structure.

DETAILED DESCRIPTION

The embodiments of present application are described in further detail below with reference to embodiments and the accompanying drawings.

Specific Embodiment 1

In an exposure method of a holographic grating of the present specific embodiment, two exposure light sources are used to emit two coherent light beams, and interference exposure is performed on a grating substrate. In the process of forming an exposure light path, setting a compensating mirror and adjusting positions of the two exposure light sources as the following steps:

(1) determining initial positions of the two exposure light sources according to design requirements and imaging quality requirements of the holographic grating.

Figure 1:
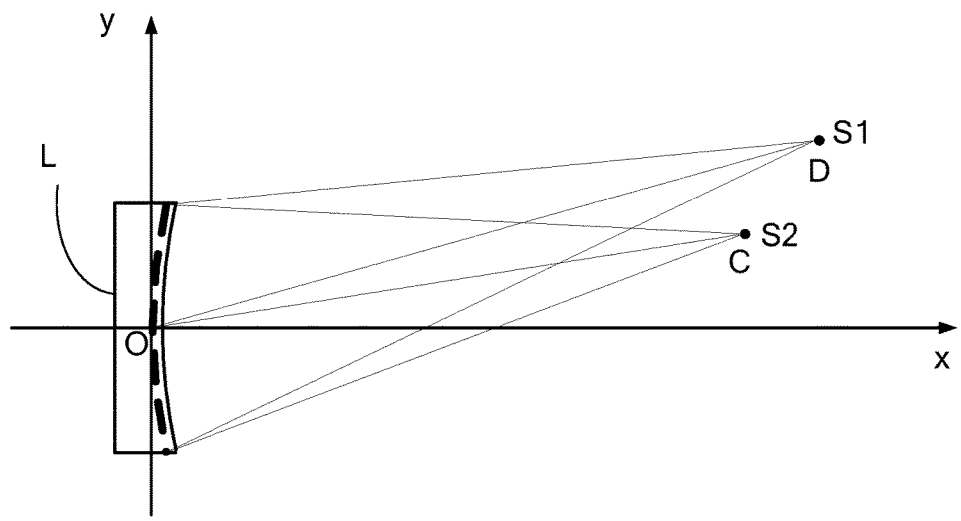
FIG. 1 is a light path schematic diagram during exposure processing of a holographic grating in prior art.
Figure 2:
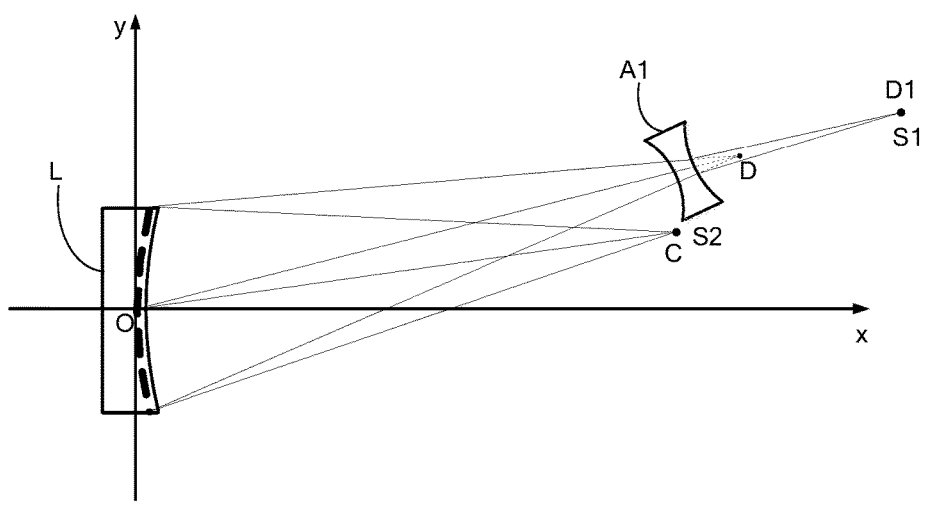
FIG. 2 is a schematic diagram of an exposure light path in an exposure method of a holographic grating according to a specific embodiment 1 of the present application.

When the initial positions are determined, a universal method is used for calculating and determining according to a light path function theory. Manufacturing design requirements comprising a working wavelength, appearance size and slit width of the grating and a spectrum surface length of the holographic grating and imaging quality requirements comprising parameters values such as resolution and flexibility of the holographic grating are substituted into an light path function, by taking the imaging quality requirements of the holographic grating as a target, the light path function theory is used to process and calculate in Matlab software, then the initial positions of the exposure light sources can be determined and are position points C and D as shown in FIG. 2 in the present specific embodiment. For example, the exposure light sources are arranged at the points C and D respectively to expose the grating substrate L, and a grating according with manufacturing requirements of a customer can be obtained.

(2) adopting optical design software to simulate an initial light path that the two exposure light sources are in the initial positions, and calculating imaging quality parameters of the grating formed after the simulated initial light path works.

The initial positions obtained in the step (1) are substituted into optical design software Zemax for modeling, simulating and optimizing to obtain an exposure light path structure, defined as an initial light path. After the simulating software simulates the initial light path, imaging quality parameters of a grating formed after for example exposure work of the simulated light path are calculated. The imaging quality parameters calculated by simulating are used in a position adjusting process of a subsequent light source. In the present specific embodiment, the imaging quality parameters adopt resolution and sensitivity.

When the resolution is calculated, for the sake of calculating, a basis for considering the resolution is that two adjacent spectrum lines are totally separated, other standards can also be adopted, for example a Rayleigh criterion serves as a standard for considering the resolution, and when the Rayleigh criterion is used, a calculated number of the resolution is relatively smaller. During calculating, set conditions are: an incident slit of the grating is SumX 1 mm, a spectrum range is 360-830 nm, a spectrum surface length is 29.1 mm, and a grating use level is +1 level. Light waves are incident to the holographic grating, and form a spectrum line through focusing of the holographic grating, and incident light waves of different wavelengths correspond to different spectrum line widths, and further correspond to different resolution values. In the present specific embodiment, in such a light wave range, an obtained minimal value of the corresponding resolution is 0.75 nm, and then the resolution of the grating is smaller than 0.75 nm.

When the sensitivity is calculated, a percentage of light intensity received by a CCD when light emitted from a slit reaches a spectrum surface through the grating accounting for the original light intensity serves as a standard and the sensitivity is 84%.

(3) setting a compensating mirror in the initial light path.

(4) adjusting positions of the exposure light sources to new positions according to a position of the compensating mirror, wherein the new positions meet conditions that when the exposure light sources are in the new positions, imaging points transmitting through the compensating mirror are the initial positions.

The present specific embodiment is of a situation of adding the compensating mirror into one exposure light path. As shown in FIG. 2, the compensating mirror adopts a concave lens A1 and is set on an exposure branch of the exposure light source, specifically on an exposure branch between an initial position point D corresponding to a first exposure light source S1 to a center position point O of the grating substrate L. Of course, a specific position of the compensating mirror in the initial light path requires considering factors: whether a practical mounting process of the compensating mirror is convenient, whether the placing of a second exposure light source S2 in the point C is interfered, whether the re-placed first exposure light source S1 is easy to place and the like. After the concave lens A1 is arranged, according to a paraxial imaging principle, the first exposure light source S1 is adjusted to the new position, so that when the first exposure light source S1 is in the new position, an imaging position transmitting through the concave lens A1 is the initial position point D.

As above, positions of the concave lens A1 and the first exposure light source S1 are set for the first time and then steps (5) and (6) are performed.

(5) adopting optical design software to simulate a new light path that the compensating mirror is arranged and the exposure light sources are in the new positions, and calculating imaging quality parameters of the grating formed after the simulated new light path works.

(6) judging whether a differential value between the imaging quality parameters in the step (5) and the imaging quality parameters in the step (2) is smaller than or equal to a set threshold value, under the condition of yes, entering to a step (7), and under the condition of no, adjusting the position of the compensating mirror and returning to steps (4)-(5).

(7) using the new positions as finial positions of the exposure light sources, and using the new light path that the compensating mirror is arranged and the exposure light sources are in the new positions as a finial exposure light path.

In above three steps, the simulating calculating in the step (5) is similar to that of the step (2), that is, the new positions of the concave lens A1 and the first exposure light source S1 determined in the steps (3) and (4) are substituted into the optical design Zemax software to be subjected to modeling, simulating and optimizing to obtain a new exposure light path structure, defined as a new light path. After new light path simulating in the simulating software, imaging quality parameters of a formed a grating after for example exposure work of the simulated new light path are calculated. Corresponding to the step (2), the resolution and sensitivity are calculated. In the step (6), the imaging parameters (resolution and sensitivity) of the grating obtained in the new light path are compared with the parameters (resolution and sensitivity) of the grating obtained in the initial light path to judge whether the two are equal, that is, whether a differential value of the two is smaller than a set threshold value, the threshold value is an empirical value set by an operator according to imaging quality requirements, and if the imaging requirements are higher, the threshold value is set to be smaller correspondingly. After judging, if yes, positions of the current compensating mirror and the first exposure light source are proper. If no, the compensating mirror is adjusted in position, and the position of the first exposure light source S1 is re-determined back to step (4), then simulating calculating is performed till the imaging parameters (resolution and sensitivity) of the grating obtained in the new light path and the parameters (resolution and sensitivity) of the grating obtained in the initial light path are equal.

In the present specific embodiment, the threshold value set in the step (6) is 10% of the imaging quality parameters of the initial light path, after adjustment for many times, as shown in FIG. 2, the concave lens A1 is in a position as shown in the drawing, the first exposure light source S1 is in the position D1 as shown in the drawing, then the new light path is formed, and after that, through simulating calculating, a corresponding resolution of the new light path is smaller than 0.8 nm and sensitivity of the new light path is 78%. Set conditions during calculating are same as set conditions during calculating in the step (2) and are not repeated herein. A differential value (0.05) between the corresponding resolution under the new light path and the corresponding resolution of the initial light path is smaller than the set threshold value (0.75*10%) of the resolution, the differential value (0.06) of the sensitivity is also smaller than the set threshold value (0.84*10%) of the sensitivity, so judging conditions are met, therefore, adjustment is finished, and a new light path is the new light path obtained by adjustment. The new position D1 serves as a final position of the first exposure light source S1; and the compensating mirror is arranged on the exposure branch, and the new light path that the exposure light sources are in the new positions serves as a final exposure light path.

The exposure method of the present specific embodiment is conceived to determine exposure initial positions, for example the positions C and D as shown in FIG. 2, of the grating when the compensating mirror is not added by calculating, programming, modeling, simulating and optimizing. Then the compensating mirror is added in front of an original exposure point D, and a new exposure point D1 is obtained by adjustment, thus obtaining a final exposure light path.

When an exposure light path obtained by the exposure method in the present specific embodiment exposes the grating, an effect is equivalent to that when the initial light path exposes the grating without influencing resolution and sensitivity of the obtained grating. Meanwhile, the compensating mirror (concave lens A1) is set in the exposure light path, the position of the first exposure light source S1 is the new position D1, a distance CD1 between the two exposure light sources S1 and S2 is enlarged compared with a distance CD in an exposure method of the prior art, and the problem of a much too close distance between the two exposure light sources in the prior art is effectively solved. That is, the exposure method in the present specific embodiment effectively solves the problem of a much too close distance between the two exposure light sources under a premise of not influencing manufacturing requirements and imaging requirements of the grating.

Specific Embodiment 2

The difference between the preset specific embodiment and the embodiment 1 lies in that: a compensating mirror in the present specific embodiment is a convex lens A2, which is arranged at an extension line of a connecting line between initial positions of the exposure light sources and a center position of the grating substrate.

Figure 3:
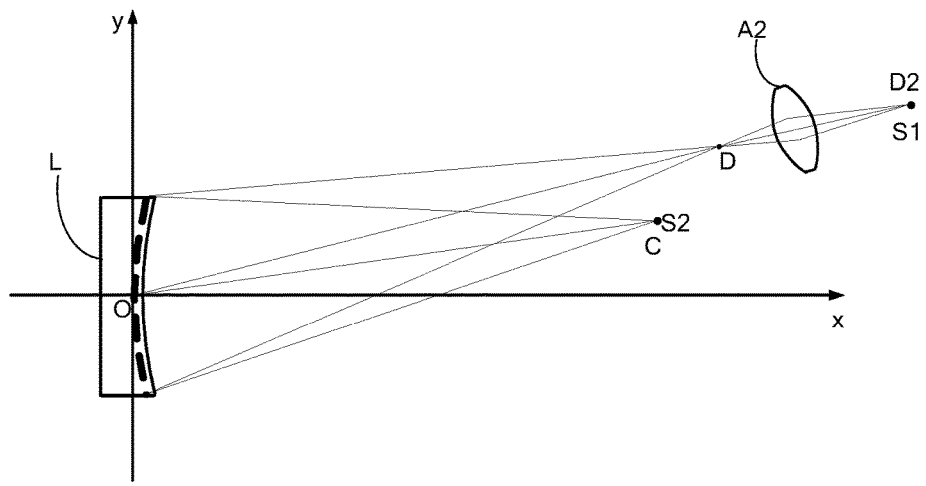
FIG. 3 is a schematic diagram of an exposure light path in an exposure method of a holographic grating according to a specific embodiment 2 of the present application.

An exposure method of a holographic grating of the present specific embodiment uses two exposure light sources to emit two coherent light beams, and interference exposure is performed on a grating substrate. In the process of forming an exposure light path, setting a compensating mirror and adjusting positions of the two exposure light sources as the following steps:

(1) determining initial positions of the two exposure light sources according to design requirements and imaging quality requirements of the holographic grating. As shown in FIG. 3, points C and D in the drawing are determined initial positions of the two exposure light sources.

(2) adopting optical design software to simulate an initial light path that the two exposure light sources are in the initial positions, and calculating imaging quality parameters of the grating formed after the simulated initial light path works. Same as the specific embodiment 1, in the initial light path, the corresponding resolution obtained by calculating is smaller than 0.75 nm, and a corresponding sensitivity obtained by calculating is 84%.

(3) setting a compensating mirror in the initial light path.

(4) adjusting positions of the exposure light sources to new positions according to a position of the compensating mirror, wherein the new positions meet conditions that when the exposure light sources are in the new positions, imaging points transmitting through the compensating mirror are the initial positions.

In the present specific embodiment, as shown in FIG. 3, the compensating mirror is a convex lens A2, and is arranged at an extension line of a connecting line between initial positions of the exposure light sources and a center position of the grating substrate, and specifically at the extension line of the connecting line between the initial position point D corresponding to a first exposure light source S1 and the center position O1 of the grating substrate L. After the convex lens A2 is arranged, according to a paraxial imaging principle, a position of the first exposure light source S1 is adjusted to a new position, to cause that when the first exposure light source S1 is in the new position, an imaging position transmitting through the convex lens A2 is the initial position point D.

(5) adopting optical design software to simulate a new light path that the compensating mirror is arranged and the exposure light sources are in the new positions, and calculating imaging quality parameters of the grating formed after the simulated new light path works.

(6) judging whether a differential value between the imaging quality parameters in the step (5) and the imaging quality parameters in the step (2) is smaller than or equal to a set threshold value, under the condition of yes, entering to a step (7), and under the condition of no, adjusting the position of the compensating mirror and returning to steps (4)-(5).

(7) using the new positions as finial positions of the exposure light sources, and using the new light path that the compensating mirror is arranged and the exposure light sources are in the new positions as a finial exposure light path.

In the present specific embodiment, the threshold value set in the step (6) is also 10% of the imaging quality parameters of the initial light path, after adjustment for many times, as shown in FIG. 3, the convex lens A2 is in a position as shown in the drawing, the first exposure light source S1 is in the position D2 as shown in the drawing, then the new light path is formed, and after that, through simulating calculating, a corresponding resolution of the new light path is smaller than 0.82 nm and sensitivity of the new light path is 80%. Set conditions during calculating are same as set conditions during calculating in the step (2) in the specific embodiment 1 and are not repeated herein. A differential value (0.07) between the corresponding resolution under the new light path and the corresponding resolution of the initial light path is smaller than the set threshold value (0.75*10%) of the resolution, the differential value (0.04) of the sensitivity is also smaller than the set threshold value (0.84*10%) of the sensitivity, so judging conditions are met, therefore, adjustment is finished, and a new light path is the new light path obtained by adjustment. The new position D2 serves as a final position of the first exposure light source S1; and the compensating mirror is arranged on the exposure branch, and the new light path that the exposure light sources are in the new positions serves as a finial exposure light path.

The exposure method of the present specific embodiment is conceived to determine exposure initial positions, for example the positions C and D as shown in FIG. 3, of the grating when the compensating mirror is not added by calculating, programming, modeling, simulating and optimizing. Then the compensating mirror is added behind an original exposure point D, and a new exposure point D2 is obtained by adjustment, thus obtaining a final exposure light path.

When an exposure light path obtained by the exposure method in the present specific embodiment exposes the grating, an effect is equivalent to that when the initial light path exposes the grating without influencing resolution and sensitivity of the grating obtained by exposure. Meanwhile, a distance CD2 between the two exposure light sources S1 and S2 is enlarged compared with a distance CD in an exposure method of the prior art. That is, the exposure method in the present specific embodiment effectively solves the problem of a much too close distance between the two exposure light sources under a premise of not influencing manufacturing requirements and imaging requirements of the grating.

Specific Embodiment 3

The present specific embodiment differs from the embodiment 1 in that: in the present specific embodiment, two exposure branches share a compensating mirror, and the compensating mirror also adopts a concave lens, but is arranged in an overlapped light path region of the two exposure branches of two exposure light sources.

Figure 4:
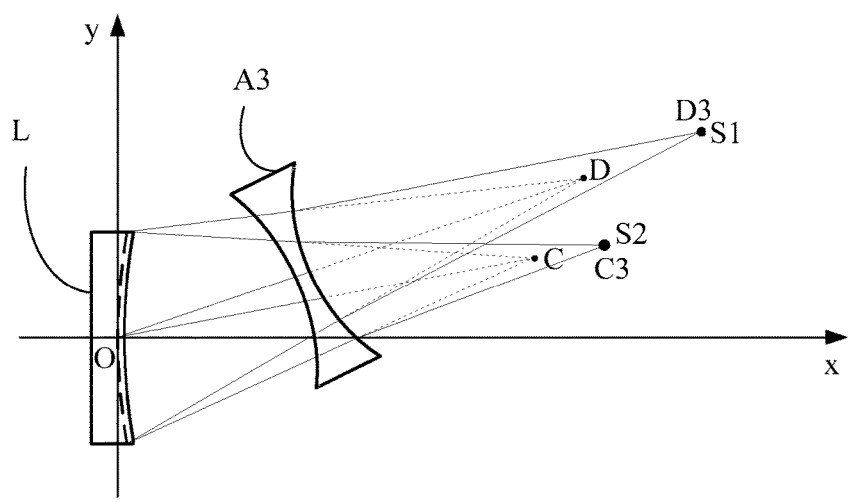
FIG. 4 is a schematic diagram of an exposure light path in an exposure method of a holographic grating according to a specific embodiment 3 of the present application.

An exposure method of a holographic grating of the present specific embodiment uses two exposure light sources to emit two coherent light beams, and interference exposure is performed on a grating substrate. In the process of forming an exposure light path, setting a compensating mirror and adjusting positions of the two exposure light sources as the following steps:

(1) determining initial positions of the two exposure light sources according to design requirements and imaging quality requirements of the holographic grating. As shown in FIG. 4, points C and D in the drawing are determined initial positions of the two exposure light sources.

(2) adopting optical design software to simulate an initial light path that the two exposure light sources are in the initial positions, and calculating imaging quality parameters of the grating formed after the simulated initial light path works. Same as the specific embodiment 1, in the initial light path, the resolution obtained by calculating is smaller than 0.75 nm, and a corresponding sensitivity obtained by calculating is 84%.

(3) setting a compensating mirror in the initial light path.

(4) adjusting positions of the exposure light sources to new positions according to a position of the compensating mirror, wherein the new positions meet conditions that when the exposure light sources are in the new positions, imaging points transmitting through the compensating mirror are the initial positions.

In the present specific embodiment, as shown in FIG. 4, the compensating mirror adopts a concave lens A3, and is arranged in an overlapped light path region of the two exposure branches of two exposure light sources. After the concave lens A3 is arranged, according to a paraxial imaging principle, positions of a first exposure light source S1 and a second exposure light source S2 are adjusted to new positions, to cause that when the first exposure light source S1 is in the new position, an imaging position transmitting through the concave lens A3 is the initial position point D, and when the second exposure light source S2 is in the new position, an imaging position transmitting through the concave lens A3 is the initial position point C. Preferably, a center of the concave lens A3 is at an angular bisector of an angle COD, and a main plane of the concave lens A3 is vertical to the angular bisector of the angle COD. Thus, after the position of the concave lens A3 is arranged, final positions of the compensating mirror and the two exposure light sources can be obtained by facilitating subsequent more quickly adjustment.

(5) adopting optical design software to simulate a new light path that the compensating mirror is arranged and the exposure light sources are in the new positions, and calculating imaging quality parameters of the grating formed after the simulated new light path works.

(6) judging whether a differential value between the imaging quality parameters in the step (5) and the imaging quality parameters in the step (2) is smaller than or equal to a set threshold value, under the condition of yes, entering to a step (7), and under the condition of no, adjusting the position of the compensating mirror and returning to steps (4)-(5).

(7) using the new positions as finial positions of the exposure light sources, and using the new light path that the compensating mirror is arranged and the exposure light sources are in the new positions as a finial exposure light path.

In the present specific embodiment, the threshold value set in the step (6) is also 10% of the imaging quality parameters of the initial light path, after adjustment for many times, as shown in FIG. 4, the concave lens A3 is in a position as shown in the drawing, the first exposure light source S1 is in the position D3 as shown in the drawing, the second exposure light source S2 is in the position C3 as shown in the drawing, then the new light path is formed, and after that, through simulating calculating, a corresponding resolution of the new light path is smaller than 0.8 nm and sensitivity of the new light path is 82.6%. Set conditions during calculating are same as set conditions during calculating in the step (2) in the specific embodiment 1 and are not repeated herein. A differential value (0.05) between the corresponding resolution under the new light path and the corresponding resolution of the initial light path is smaller than the set threshold value (0.75*10%) of the resolution, the differential value (0.014) of the sensitivity is also smaller than the set threshold value (0.84*10%) of the sensitivity, so judging conditions are met, therefore, adjustment is finished, and a new light path is the new light path obtained by adjustment. The new position D3 serves as a final position of the first exposure light source S1, and the new position C3 serves as a final position of the second exposure light source S2; and the compensating mirror is arranged on the exposure branch, and the new light path that the exposure light sources are in the new positions serves as a final exposure light path.

The exposure method of the present specific embodiment is conceived to determine exposure initial positions, for example the positions C and D as shown in FIG. 4, of the grating when the compensating mirror is not added by calculating, programming, modeling, simulating and optimizing. Then the compensating mirror is added in front of original exposure points D and C, and new exposure points D3 and C3 are obtained by adjustment, thus obtaining a final exposure light path.

When an exposure light path obtained by the exposure method in the present specific embodiment exposes the grating, an effect is equivalent to that when the initial light path exposes the grating without influencing resolution and sensitivity of the grating obtained by exposure. Meanwhile, a distance C3D3 between the two exposure light sources S1 and S2 is enlarged compared with a distance CD in an exposure method of the prior art. That is, the exposure method in the present specific embodiment effectively solves the problem of a much too close distance between the two exposure light sources under a premise of not influencing manufacturing requirements and imaging requirements of the grating.

Specific Embodiment 4

The present specific embodiment differs from the embodiment 1 in that: in the present specific embodiment, a compensating mirror is added in the two exposure branches respectively. The compensating mirrors comprise a concave lens and a convex lens, the concave lens is arranged at the exposure branch of one exposure light source, and the convex lens is arranged at an extension line of a connecting line between an initial position of the other exposure light source and a center position of a grating substrate.

Figure 5:
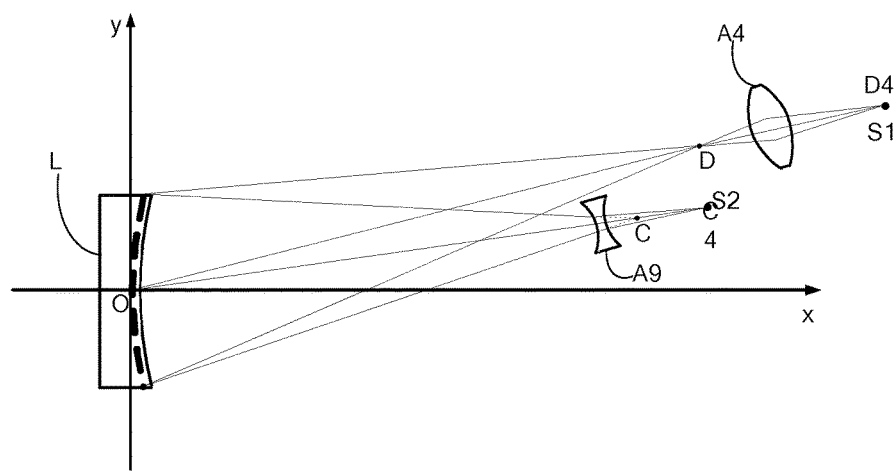
FIG. 5 is a schematic diagram of an exposure light path in an exposure method of a holographic grating according to a specific embodiment 4 of the present application.

The exposure method of the present specific embodiment similarly comprises steps (1)-(5), except for that the compensating mirror is arranged on the two exposure branches respectively. As shown in FIG. 5, a concave lens A9 is arranged at the exposure branch of one exposure light source, specifically at the exposure branch between an initial position point C corresponding to the second exposure light source S2 and a center position point O of a grating substrate L; a convex lens A4 is arranged at an extension line of a connecting line between an initial position of the other exposure light source and a center position of a grating substrate, specifically at an extension line of a connecting line between an initial position point D of the first exposure light source S1 and a center position point O of the grating substrate L. During adjusting, after a position of the convex lens A4 is set, a position of the first exposure light source S1 is adjusted to cause that when the first exposure light source S1 is in a new position, an imaging position transmitting through the convex lens A4 is the initial position point D. Similarly, after a position of the concave lens A9 is set, a position of the second exposure light source S2 is adjusted to cause that when the second exposure light source S2 is in a new position, an imaging position transmitting through the concave lens A9 is the initial position point C. Finally, by adjusting for many times, when the convex lens A4 and the concave lens A9 are in the positions as shown in FIG. 5, and when the first exposure light source A1 is in the D4 position and the second light source A2 is in the C4 position, a new light path is formed, imaging parameters corresponding to the new light path are compared with the imaging parameters corresponding to the initial light path, differential values of the two are in the set threshold values. Therefore, the two compensating mirrors are arranged in the initial light path, and the new light path that the two exposure light sources are respectively positioned in the new positions serves as a final exposure light path.

The exposure method of the present specific embodiment is conceived to comprise the following steps: determining exposure initial positions, for example the positions C and D as shown in FIG. 5, of the grating when the compensating mirror is not added by calculating, programming, modeling, simulating and optimizing. Then one compensating mirror is added in front of or behind an original exposure point D, the position of the first exposure light source is adjusted, and a new exposure point D4 is obtained; meanwhile, one compensating mirror is added in front of or behind an original exposure point C, the position of the second exposure light source is adjusted, and a new exposure point C4 is obtained, thus obtaining a final exposure light path.

When an exposure light path obtained by the exposure method in the present specific embodiment exposes the grating, an effect is equivalent to that when the initial light path exposes the grating without influencing resolution and sensitivity of the grating obtained by exposure. Meanwhile, a distance C4D4 between the two exposure light sources S1 and S2 is enlarged compared with a distance CD in an exposure method of the prior art. That is, the exposure method in the present specific embodiment effectively solves the problem of a much too close distance between the two exposure light sources under a premise of not influencing manufacturing requirements and imaging requirements of the grating.

Specific Embodiment 5

The present specific embodiment differs from the embodiment 1 in that: in the present specific embodiment, a compensating mirror is a reflection mirror A5 and is arranged at an exposure branch of an exposure light source, specifically at an exposure branch between an initial position point D corresponding to a first exposure light source S1 and a center position point O of a grating substrate L.

Figure 6:
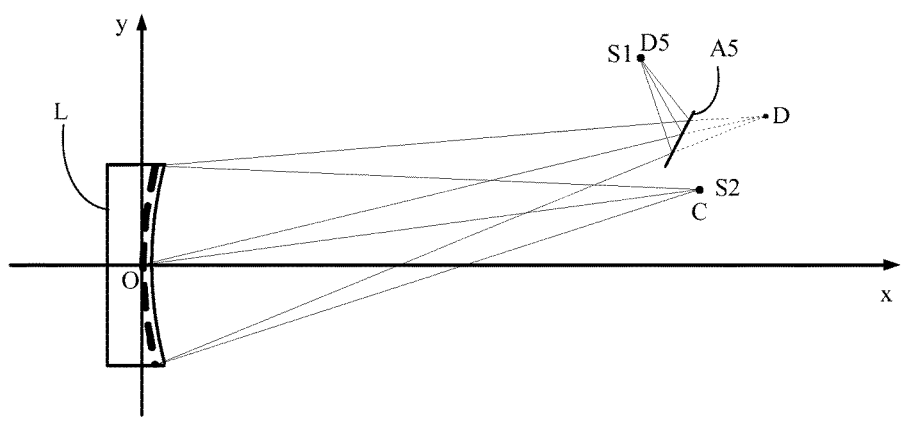
FIG. 6 is a schematic diagram of an exposure light path in an exposure method of a holographic grating according to a specific embodiment 5 of the present application.

An exposure method of a holographic grating of the present specific embodiment uses two exposure light sources to emit two coherent light beams, and interference exposure is performed on a grating substrate. In the process of forming an exposure light path, setting a compensating mirror and adjusting positions of the two exposure light sources as the following steps:

(1) determining initial positions of the two exposure light sources according to design requirements and imaging quality requirements of the holographic grating. As shown in FIG. 6, points C and D in the drawing are determined initial positions of the two exposure light sources.

(2) adopting optical design software to simulate an initial light path that the two exposure light sources are in the initial positions, and calculating imaging quality parameters of the grating formed after the simulated initial light path works. Same as the specific embodiment 1, in the initial light path, the resolution obtained by calculating is smaller than 0.75 nm, and a corresponding sensitivity is 84%.

(3) setting a compensating mirror in the initial light path.

(4) adjusting positions of the exposure light sources to new positions according to a position of the compensating mirror, wherein the new positions meet conditions that when the exposure light sources are in the new positions, imaging points transmitting through the compensating mirror are the initial positions.

In the present specific embodiment, as shown in FIG. 6, the compensating mirror adopts a reflection mirror AS and is arranged at an exposure branch of an exposure light source, specifically at an exposure branch between the initial position point D corresponding to the first exposure light source S1 and the center position point O of the grating substrate L. After the reflection mirror AS is arranged, according to a plane mirror imaging principle, a position of the first exposure light source S1 is adjusted to a new position, to cause that when the first exposure light source S1 is in the new position, an imaging position transmitting through the reflection mirror A5 is the initial position point D.

(5) adopting optical design software to simulate a new light path that the compensating mirror is arranged and the exposure light sources are in the new positions, and calculating imaging quality parameters of the grating formed after the simulated new light path works.

(6) judging whether a differential value between the imaging quality parameters in the step (5) and the imaging quality parameters in the step (2) is smaller than or equal to a set threshold value, under the condition of yes, entering to a step (7), and under the condition of no, adjusting the position of the compensating mirror and returning to steps (4)-(5).

(7) using the new positions as finial positions of the exposure light sources, and using the new light path that the compensating mirror is arranged and the exposure light sources are in the new positions as a finial exposure light path.

In the present specific embodiment, the threshold value set in the step (6) is also 10% of the imaging quality parameters of the initial light path, after adjustment for many times, as shown in FIG. 6, the reflection mirror A5 is in a position as shown in the drawing, the first exposure light source S1 is in the position D5 as shown in the drawing, then the new light path is formed, and after that, through simulating calculating, a corresponding resolution of the new light path is smaller than 0.8 nm and sensitivity of the new light path is 83.6%. Set conditions during calculating are same as set conditions during calculating in the step (2) in the specific embodiment 1 and are not repeated herein. A differential value (0.05) between the corresponding resolution under the new light path and the corresponding resolution of the initial light path is smaller than the set threshold value (0.75*10%) of the resolution, the differential value (0.004) of the sensitivity is also smaller than the set threshold value (0.84*10%) of the sensitivity, so judging conditions are met, therefore, adjustment is finished, and a new light path is the new light path obtained by adjustment. The new position D5 serves as a final position of the first exposure light source S1; and the compensating mirror is arranged on the exposure branch, and the new light path that the exposure light sources are in the new positions serves as a final exposure light path.

The exposure method of the present specific embodiment is conceived to determine exposure initial positions, for example the positions C and D as shown in FIG. 6, of the grating when the compensating mirror is not added by calculating, programming, modeling, simulating and optimizing. Then the compensating mirror is added in front of an original exposure point D, and a new exposure point D5 is obtained by adjustment, thus obtaining a final exposure light path.

When an exposure light path obtained by the exposure method in the present specific embodiment exposes the grating, an effect is equivalent to that when the initial light path exposes the grating without influencing resolution and sensitivity of the grating obtained by exposure. Meanwhile, a distance CD5 between the two exposure light sources S1 and S2 is enlarged compared with a distance CD in an exposure method of the prior art. That is, the exposure method in the present specific embodiment effectively solves the problem of a much too close distance between the two exposure light sources under a premise of not influencing manufacturing requirements and imaging requirements of the grating.

Specific Embodiment 6

The present specific embodiment is similar to the specific embodiment 5, and is a situation that a compensating mirror adopts a reflection mirror, and is arranged at an exposure branch of the other exposure light source.

Figure 7:
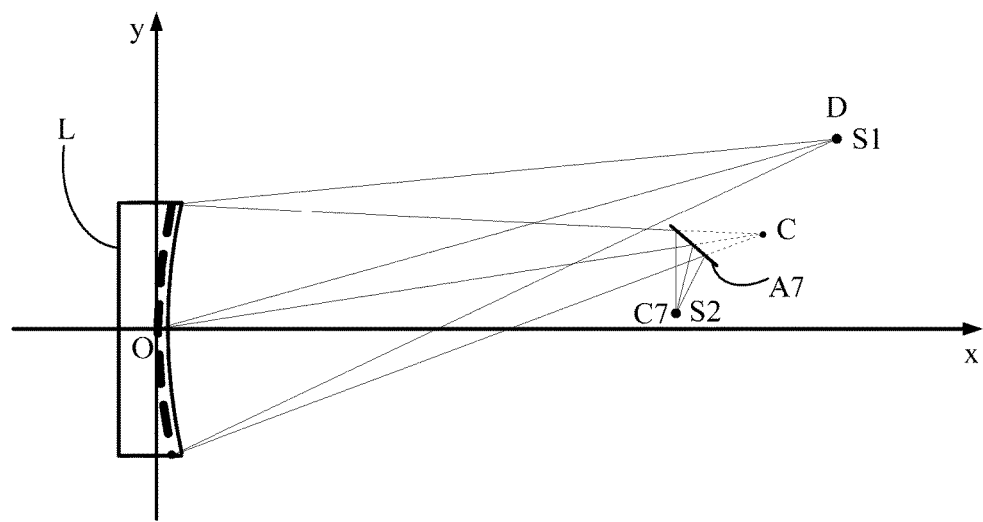
FIG. 7 is a schematic diagram of an exposure light path in an exposure method of a holographic grating according to a specific embodiment 6 of the present application.

An exposure method in the present specific embodiment is similar to that in the embodiment 5 and is not repeated herein. A difference is merely that after a reflection mirror A7 is arranged, a second exposure light source S2 is adjusted to a new position C7 point, thus forming a final exposure light path as shown in FIG. 7. When an exposure light path obtained by the exposure method in the present specific embodiment exposes the grating, an effect is equivalent to that when the initial light path exposes the grating without influencing resolution and sensitivity of the grating obtained by exposure. Meanwhile, a distance C7D between the two exposure light sources S1 and S2 is enlarged compared with a distance CD in an exposure method of the prior art. That is, the exposure method in the present specific embodiment effectively solves the problem of a much too close distance between the two exposure light sources under a premise of not influencing manufacturing requirements and imaging requirements of the grating.

Specific Embodiment 7

The present specific embodiment is similar to the specific embodiment 5, and is a situation that a compensating mirror adopts a reflection mirror, and is arranged at each of exposure branches of two exposure light sources.

Figure 8:
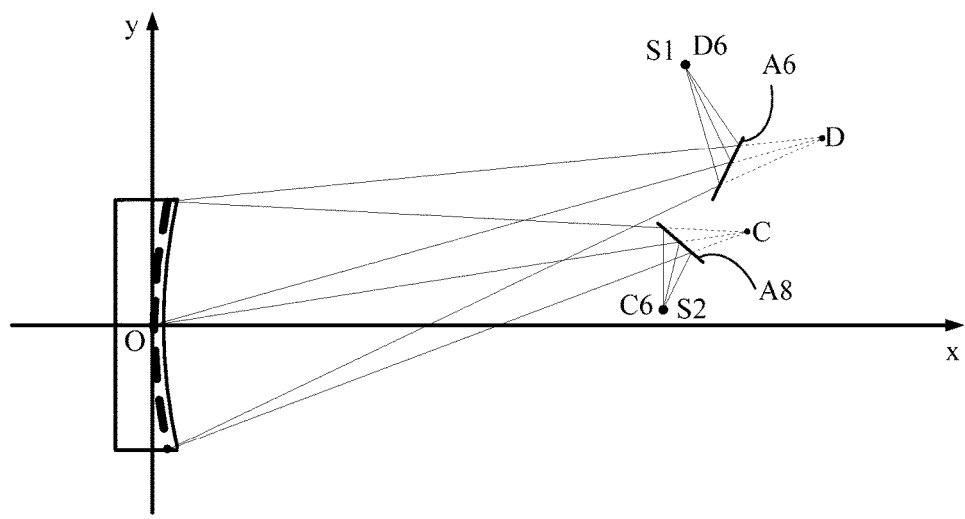
FIG. 8 is a schematic diagram of an exposure light path in an exposure method of a holographic grating according to a specific embodiment 7 of the present application.

An exposure method in the present specific embodiment is similar to that in the embodiment 5 and is not repeated herein. A difference is merely that after a reflection mirror A6 is arranged, a first exposure light source S1 is adjusted to a new position D6 point, and after a reflection mirror A8 is arranged, a second exposure light source S2 is adjusted to a new position point C6, thus forming a final exposure light path as shown in FIG. 8. When an exposure light path obtained by the exposure method in the present specific embodiment exposes the grating, an effect is equivalent to that when the initial light path exposes the grating without influencing resolution and sensitivity of the grating obtained by exposure. Meanwhile, a distance C6D6 between the two exposure light sources S1 and S2 is enlarged compared with a distance CD in an exposure method of the prior art. That is, the exposure method in the present specific embodiment effectively solves the problem of a much too close distance between the two exposure light sources under a premise of not influencing manufacturing requirements and imaging requirements of the grating.

Although the present application is described above in further detail through specific embodiments, the present application is not limited to the specific embodiments. It should be understood by persons of ordinary skill in the art that any simple deduction or replacement made without departing from the spirit of the present application shall fall within the protection scope of the present application.

What is claimed is:

1. An exposure method of a holographic grating, using two exposure light sources to emit two coherent light beams and performing interference exposure on substrate of a grating, wherein comprising a step of adjusting positions of the two exposure light sources to form an exposure light path:
   (1) determining initial positions of the two exposure light sources according to design requirements and imaging quality requirements of the holographic grating;
   (2) adopting optical design software to simulate an initial light path that the two exposure light sources are in the initial positions, and calculating imaging quality parameters of the grating formed after the simulated initial light path works;
   (3) setting a compensating mirror in the initial light path;
   (4) adjusting positions of the exposure light sources to new positions according to a position of the compensating mirror, wherein the new positions meet conditions that when the exposure light sources are in the new positions, imaging points transmitting through the compensating mirror are the initial positions;
   (5) adopting optical design software to simulate a new light path where the compensating mirror is arranged and where the exposure light sources are in the new positions, and calculating imaging quality parameters of the grating formed after the simulated new light path works;
   (6) determining whether a differential value between the imaging quality parameters in the step (5) and the imaging quality parameters in the step (2) is smaller than or equal to a set threshold value, under the condition of yes, entering to a step (7), and under the condition of no, adjusting the position of the compensating mirror and returning to steps (4)-(5); and
   (7) using the new positions as final positions of the exposure light sources, and using the new light path where the compensating mirror is arranged and where the exposure light sources are in the new positions as a final exposure light path.

2. The exposure method of a holographic grating according to claim 1, wherein: in the step (3), the compensating mirror is a concave lens and is arranged at an exposure branch of an exposure light source.

3. The exposure method of a holographic grating according to claim 1, wherein: in the step (3), the compensating mirror is a convex lens and is arranged at an extension line of a connecting line between an initial position of an exposure light source and a center position of the substrate of the grating.

4. The exposure method of a holographic grating according to claim 1, wherein: in the step (3), the compensating mirror is a concave lens and is arranged in an overlapped light path region of two exposure branches of two exposure light sources.

5. The exposure method of a holographic grating according to claim 4, wherein: a center of the concave lens is on an angular bisector of an angle COD, and a main plane of the concave lens is vertical to the angular bisector of the angle COD, wherein a point C and a point D are respectively initial positions of two exposure light sources and a point O is a center position of the substrate of the grating.

6. The exposure method of a holographic grating according to claim 1, wherein: in the step (3), the compensating mirror comprises a concave lens and a convex lens, the concave lens is arranged at an exposure branch of one exposure light source, and the convex lens is arranged at an extension line of a connecting line between an initial position of the other exposure light source and a center position of the substrate of the grating.

7. The exposure method of a holographic grating according to claim 1, wherein: in the step (3), the compensating mirror is a reflection mirror and is arranged at an exposure branch of an exposure light source.

8. The exposure method of a holographic grating according to claim 1, wherein: in the step (2) or the step (5), the optical design software is Zemax optical design software.

9. The exposure method of a holographic grating according to claim 1, wherein: in the step (2) and the step (5), the imaging quality parameters comprise resolution and/or sensitivity.

10. An exposure light path of a holographic grating, wherein comprising two exposure light sources, a compensating mirror and substrate of a grating; positions of the two exposure light sources are set according to the exposure method in claim 1 to enable the two exposure light sources to form an exposure light path together with the compensating mirror and the grating substrate; and the two exposure light sources emit two coherent light beams and interference exposure is performed on the substrate of the grating.

\* \* \* \* \*